United States Patent
Shen et al.

(10) Patent No.: US 9,954,897 B2
(45) Date of Patent: Apr. 24, 2018

(54) METHODS AND SYSTEMS PROVIDING CYBER SECURITY

(71) Applicant: Intelligent Fusion Technology, Inc, Germantown, MD (US)

(72) Inventors: Dan Shen, Germantown, MD (US); Genshe Chen, Germantown, MD (US); Khanh D. Pham, Germantown, MD (US); Erik Blasch, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 116 days.

(21) Appl. No.: 15/057,234

(22) Filed: Mar. 1, 2016

(65) Prior Publication Data

US 2017/0257396 A1   Sep. 7, 2017

(51) Int. Cl.
*G06F 7/00* (2006.01)
*H04L 29/06* (2006.01)
*G06N 7/00* (2006.01)

(52) U.S. Cl.
CPC ......... *H04L 63/1491* (2013.01); *G06N 7/005* (2013.01); *H04L 63/1408* (2013.01)

(58) Field of Classification Search
CPC ......... G06F 2221/2101; H04L 63/1416; H04L 63/1491
See application file for complete search history.

(56) References Cited

U.S. PATENT DOCUMENTS

| | | | |
|---|---|---|---|
| 8,271,345 B1 * | 9/2012 | Milgrom | G06Q 30/08 705/26.1 |
| 2005/0166072 A1 * | 7/2005 | Converse | H04L 63/1441 726/5 |
| 2008/0289040 A1 * | 11/2008 | Ithal | H04L 63/1416 726/23 |
| 2010/0042418 A1 * | 2/2010 | Olsson | G06Q 10/06 705/1.1 |
| 2013/0096980 A1 * | 4/2013 | Basavapatna | G06Q 10/00 705/7.28 |
| 2015/0018060 A1 * | 1/2015 | Naveh | G06N 99/005 463/9 |
| 2015/0128246 A1 * | 5/2015 | Feghali | H04L 63/0209 726/13 |
| 2016/0308898 A1 * | 10/2016 | Teeple | H04L 63/1433 |

OTHER PUBLICATIONS

Shen et al., Game Theoretic Solutions to Cyber Attack and Network Defense problems, 2007.*

* cited by examiner

*Primary Examiner* — Sayed Beheshti Shirazi
(74) *Attorney, Agent, or Firm* — Anova Law Group, PLLC (57) ABSTRACT

Methods and systems for providing cyber security, wherein a computer with network access incorporates game theory and utilizes a honeypot to enhance game-theoretic developments over active and passive sensors. To numerically solve the uniquely three-sided game modeled cyber security problem, using a geometric solution based on three-dimensional (3D) action surface and action curve. The methods and systems determine whether the game problem has one Nash equilibrium, multiple Nash equilibriums, or no Nash equilibrium; checks whether the equilibrium is a mixed or pure Nash; and timely computes Nash equilibriums; and follows a fictitious play concept. The solution is adaptive and can be applied for any partially observed cyber security system.

4 Claims, 8 Drawing Sheets

METHODS AND SYSTEMS PROVIDING CYBER SECURITY

STATEMENT OF GOVERNMENT INTEREST

This invention was made with Government support under Contract No. FA9453-14-C-0016, awarded by the United States Air Force. The U.S. Government has certain rights in this invention.

FIELD OF THE INVENTION

The present invention relates generally to the field of network security. More particularly, the present invention is related to methods for analysis of cyber network interactions among attackers, passive network sensors, and active network sensors using three-sided games, where each side can have multiple participants sharing the same goal. The method provides network security based on the analysis.

BACKGROUND

Network attacks include one-to-one attacks, one-to-many attacks, and many-to-one attacks. Existing network security methods suffer from high false positives, difficulty in detecting highly complex attacks, and the inability to adapt for detecting new types of attacks. Moreover, existing methods often perform attack identification in a passive manner by using only available alerts instead of actively seeking and prioritizing the most useful alerts to mitigate. Another aspect that is lacking with current methods is the inability to provide effective mitigation of network threats, predicting future attacks, and resolving multiple simultaneous attacks. For current methods, the recommendation of mitigation is usually provided in an ad hoc and heuristic manner, often independent of the situation awareness (SA) process, the user, or the importance of the network for operational considerations.

SUMMARY OF THE EMBODIMENTS

It is a feature of the present invention to provide network security in the form of three-sided game-theoretic analysis of the cyber network interactions among attackers, passive network sensors, and active network sensors. A honeypot (e.g., including active network sensors) can act as a supportive side, which can be camouflaged in the network to help passive sensors detect and track cyber network attacks.

In accordance with an additional feature of the present invention, a system is provided that includes a computer programmed for three-side game-theoretic analysis of cyber network interactions among attackers, passive network sensors, and active network sensors. A honeypot acts as a support side, which can be camouflaged in the network to help passive network sensors detect and track cyber network attacks, and which generally originate from attacking servers. Game theory is relatively a new application for cyber research, and the use of a honey net provides a unique aspect of the work that enhances game-theoretic developments over passive network sensors and active network sensors.

It is yet another feature of the present invention to utilize a geometric solution based on a three-dimensional action curve (for a cyber defender) and a three-dimensional action surface (for a cyber attacker) to numerically solve the uniquely three-side game modeled cyber security problem. The numerical game solution includes four features: first, it can quickly determine whether the game problem has one Nash equilibrium, multiple Nash equilibriums, or no Nash equilibrium; second, it can efficiently check if the equilibrium is a mixed or pure Nash; third, it can timely compute the (mixed) Nash equilibriums; and fourth, it also follows a Fictitious Play Concept. These four features provide an adaptive solution and can be applied in any partially observed cyber security system.

DETAILED DESCRIPTION OF EMBODIMENTS

The purpose of this invention is to develop three-sided game theory based innovative situation awareness systems and methods for active network security and impact mitigation of adversarial attacks against cyber networks.

Figure 1:
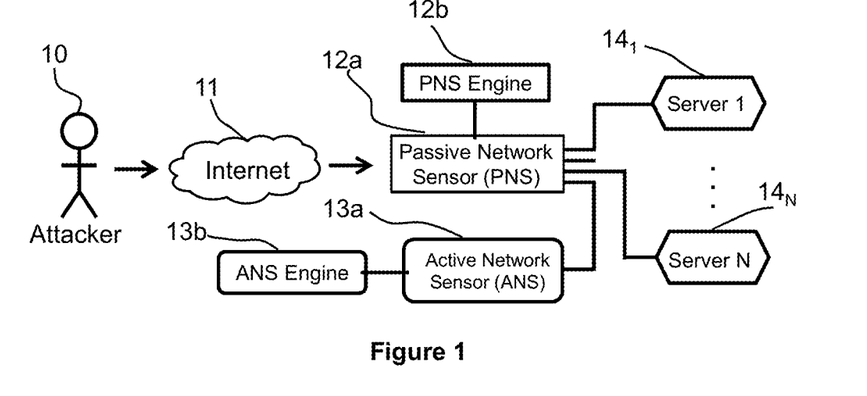
FIG. 1 illustrates a block diagram of a system in accordance with features of the present invention.

Referring to FIG. 1, there is shown an implementation of a cyber-network security system according to the invention in a local network having the passive and active network sensors deployed. The local network comprises N production server 14.sub.1 to 14.sub.N. The network traffic can be monitored by a Snort based passive network sensor (PNS) 12a, which can be controlled by the PNS engine 12b. Some network requests can be routed to an active network sensor (ANS) 13b, which can interact with remote users in a virtual way. The ANS can be deployed based on Honeypot and Address Resolution Protocol Daemon (ARPD). The interaction scripts and strategies can be reconfigured via the ANS engine 13b. The attacker 10 can launch cyber-attacks to the local network via the Internet 11. The PNS engine and ANS engine can follow the mixed Nash equilibrium of the three-side game model shown in FIG. 2.

Figure 2:
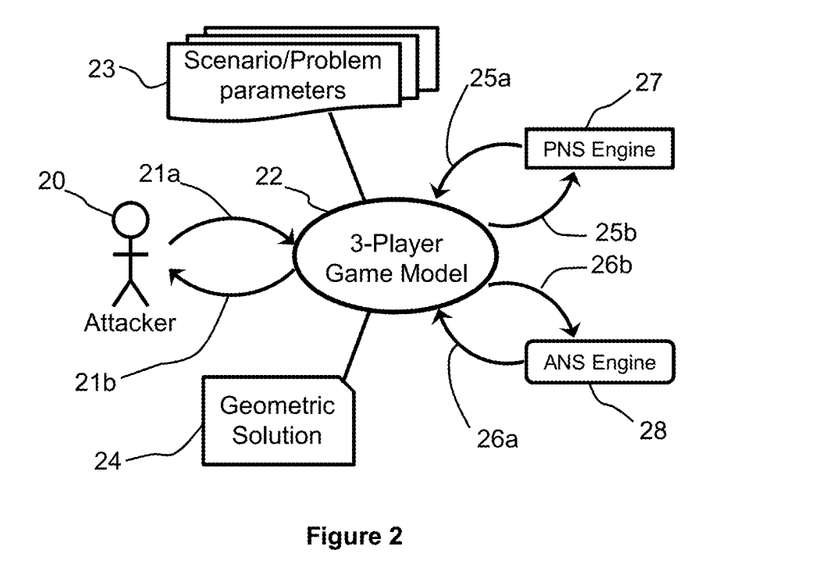
FIG. 2 is a concept level block diagram of the three-sided game model for cyber network security problems.

FIG. 2 shows the concept level framework of the three-side game model. Attacker 2 may launch various cyber-attack weapons 21a, which are inputs to the game model. Attacks will get rewards 21b, which depend on the game model parameters 23, PNS strategies 25a, and ANS strategies 26a. Similarly, PNS engine 27 and ANS engine 28 can obtain their rewards 25b and 26b respectively. Their values are also partially determined by the attacker's choices. This reward dependence is the main modeling merit of game theory method: decisions should be made with the consideration of the opponents. To obtain the game solution of Mixed Nash equilibrium (MNE), the invention presents a geometric solution 24 to determine and calculate the intersection point of attacker's action surface and defender's action curve. The action surface or action curve is set of one side's best response actions for his opponents' possible choices. In the three cyber game model, the ANS and PNS are coordinated to defend attackers. Therefore, given a combined PNS and ANS choices ($h_k$, $s_k$), the attacker will compute his best response $r_k$. Since $h_k$, $s_k$ and $r_k$ are all scalar values, the attacker's best response set is a surface, which is called an action surface. Similarly, for ANS and PNS, their combined best response is a curve, called an action curve.

Figure 3:
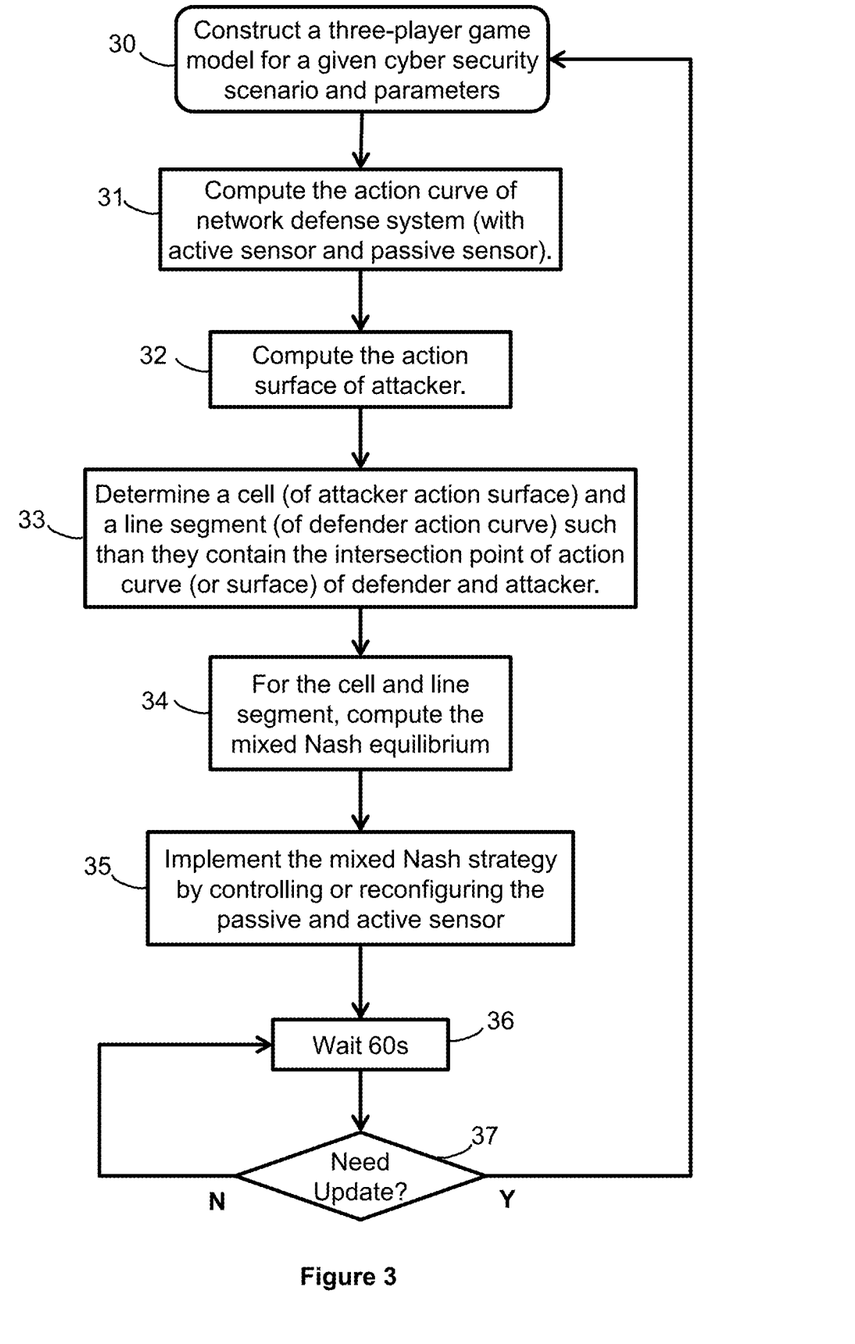
FIG. 3 depicts the system level flowchart of the three-sided game model and the geometric method.

FIG. 3 shows the system level flowchart of the invention. Block 30 creates a three-sided game model based on a scenario or problem. For the general scenario in FIG. 1, the system states are defined as the probability vector of N servers:

$$(p^1_{1|1}, p^1_{1|0}, p^2_{1|1}, p^2_{1|0}, \ldots, p^N_{1|1}, p^N_{1|0}) \quad (1)$$

where $p^i_{1|1}$ is the detection rate (DR), which is the probability that server i is flagged as attacked when it is actually attacked, $p^i_{1|0}$ is the false positive rate (FPR), which is the probability that server i is flagged as attacked when it is actually NOT attacked.

Figure 4:
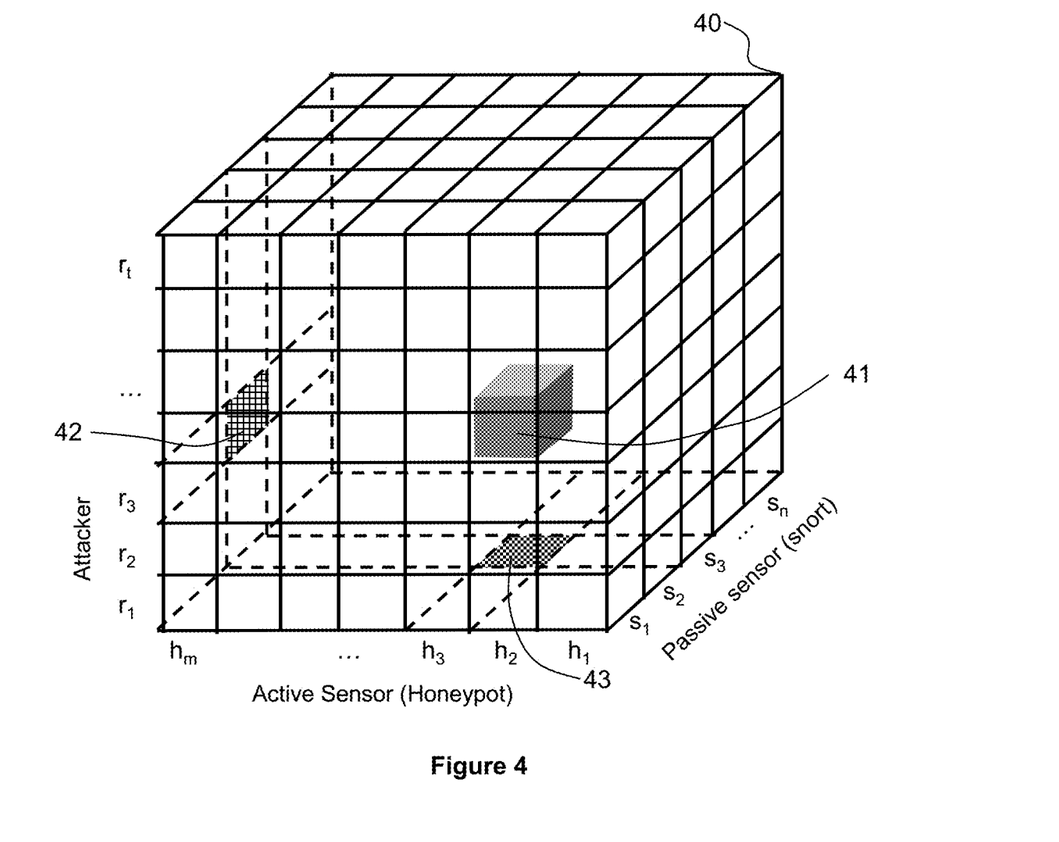
FIG. 4 depicts an exemplary three sided game in a matrix format.

Given the system state vector $p=(p^1_{1|1}, p^1_{1|0}, p^2_{1|1}, p^2_{1|0}, \ldots)'$, the reward functions for the attacker and defender are defined as $$J_d(p) = \Sigma_{i=1:N}(c^{i1}p^i_{1|1} - c^{i2}p^i_{0|1} - c^{i3}p^i_{1|0}) \quad (2)$$

$$J_a(p) = \Sigma_{i=1:N}(v^{i1}p^i_s - v^{i2}p^i_t) \quad (3)$$

where $c^{i1}$, $c^{i2}$, $c^{i3}$ are the positive constants for server i; $p^i_{0|1} = 1 - p^i_{1|1}$ is the miss detection probability; $v^{i1}$, $v^{i2}$ are the value of server i and the cost of attacking server i; $p^i_s$ is the probability of successfully penetrate server i. The model includes $p^i_s = p^i_{0|1} p_a(j)$, where $p_a(j)$ is the success rate of the selected attack (j). $p^i_f$ is the probability that an attack on server i is failed and $p^i_f = p^i_{1|1} + p^i_{0|1}(1-p_a(j))$. The three-sided interaction is modeled as a matrix game. FIG. 4 depicts an exemplary three-sided game in a matrix format. The game size (shown by 40) is determined by the possible strategies of the three sides. After all sides choose their strategies, a special three-dimensional (3D) action curve or cube can be picked. For example, if attacker chooses $r_3$, ANS engine chooses $h_3$, and PNS engine chooses $s_3$, then cube 41 is picked. Square 43 is the coordinated strategy of PNS and ANS. Square 42 tells the chosen attacker strategy. In the cube 41, there are two values obtained from equation (2) and (3), respectively.

The game in FIG. 4 is played by three sides in such a way that attacker chooses his strategy to maximize the $J_a$ (eq. 3) in the picked cube (for example cube 41 in FIG. 4), while PNS and ANS engines choose their coordinated strategies to maximize the $J_d$ (eq. 2) in the same cube, which depends on both attacker's and PNS/ANS combined engine choices.

To solve the three-sided game problem, this invention presents a geometric solution to compute MNEs. The action curve (surface) based solution is depicted in block 31-34 of FIG. 3. Block 31 computes the action curve of PNS and ANS engines. For all possible attacker strategies, eq. (2) is maximized by choosing the coordinated PNS and ANS strategies. By connecting all these best responses of coordinated strategies, along with the chosen attacker strategies, block 31 obtains the defender action curve.

Block 32 computes the action surface of attacker. For any possible coordinated PNS and ANS strategies, eq. (3) is maximized by choosing the attacker strategy. Then block 32 connects these best responses of attacking strategies, along with the chosen coordinated defender strategies, to obtain the attacker action surface.

For the three-sided game, an intersection of action curve and surface is a Nash strategy. If the intersection located exactly on these best response points, then the Nash strategy is a pure Nash equilibrium (PNE). Otherwise it is a mixed Nash equilibrium (MNE). PNE can be seemed a special case of MNE, so in this invention, MNEs can be used to solve the three-sided game model. Another advantage of MNE is that at least one MNE always exists for the three-sided game model for cyber network security.

Figure 5:
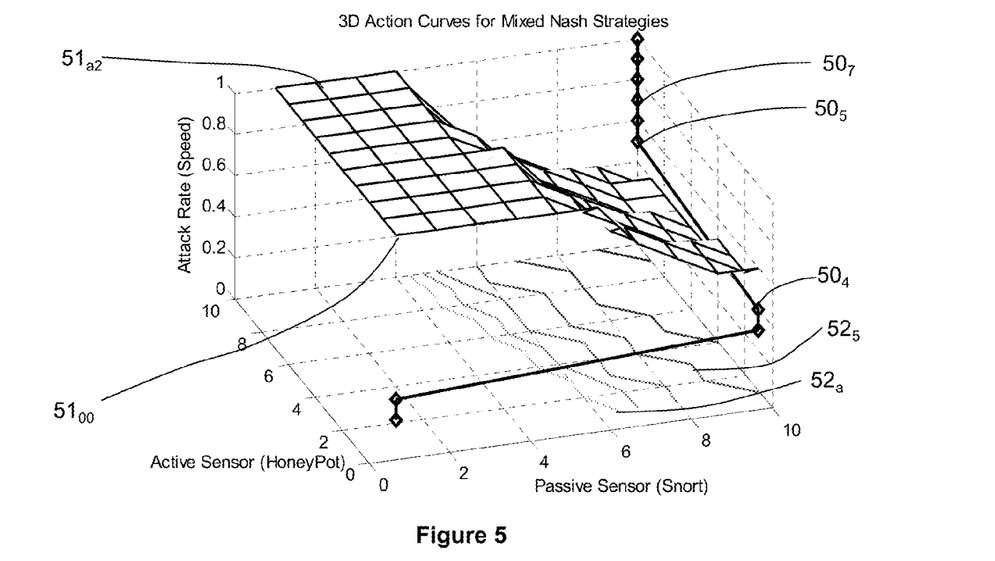
FIG. 5 is an exemplary action curve and surface intersection which has pure active sensor strategy.

FIG. 5 is an exemplary action curve and surface intersection which has a pure active sensor strategy. $51_{00}$ is the point at attacker action surface when ANS and PNS engines choose the coordinated strategy (0, 0). $51_{a2}$ is the point at attacker action surface when ANS and PNS engines choose the coordinated strategy (10, 2). $50_7$ is the point at the defender action curve when attacker takes no. 7 strategy. $50_5$ is the point at the defender action curve when attacker takes no. 5 strategy. $52_5$ and $52_a$ are the contour lines of the attacker action surface when the attacking rate is 50% and 100% of the maximum attacking speed. From the plot in FIG. 5, it is obvious that PNS engine will play his No. 10 strategy and the intersection occurs between $50_4$ and $50_5$ at the action curve.

Figure 6:
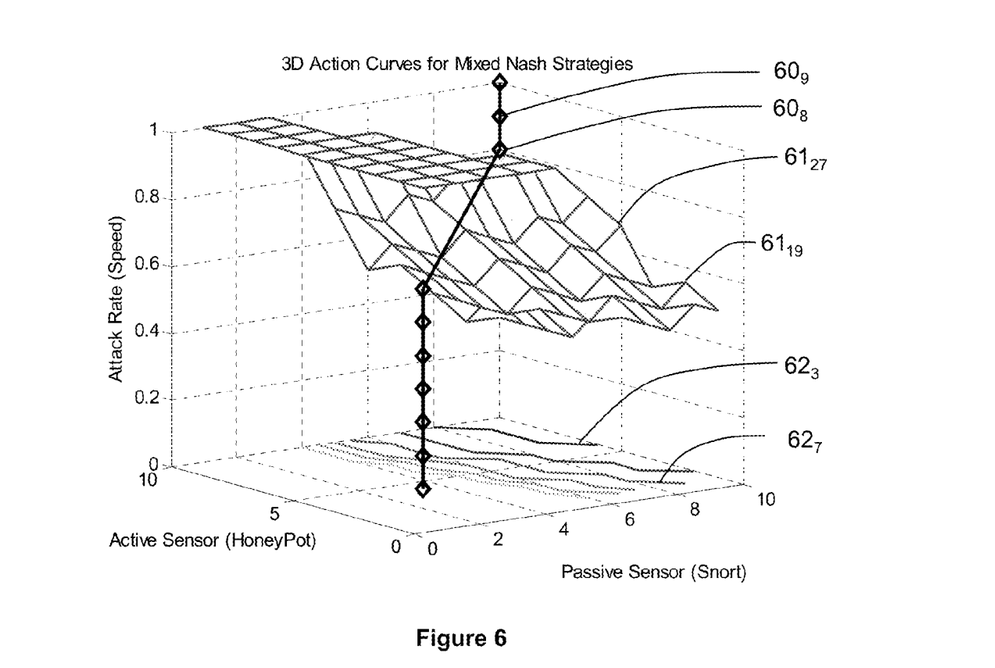
FIG. 6 depicts another exemplary action curve and surface intersection which is a typical mixed Nash equilibrium.

FIG. 6 depicts another exemplary action curve and action surface intersection which is a typical mixed Nash equilibrium. $60_9$ is the point at the defender action curve when attacker takes no. 9 strategy. $60_8$ is the point at the defender action curve when attacker takes no. 8 strategy. $61_{27}$ is the point at attacker action surface when ANS and PNS engines choose the coordinated strategy (2, 7). $61_{19}$ is the point at attacker action surface when ANS and PNS engines choose the coordinated strategy (1, 9). $62_{23}$ and $62_7$ are the contour lines of the attacker action surface when the attacking rate is 30% and 70% of the maximum attacking speed. From the plot in FIG. 8, it is difficult to find location of the intersection. Therefore, the invention presents a geometric solution (FIG. 7) to find cells in action surface and the related line segments in action curve so that they contains the intersection points.

Figure 7:
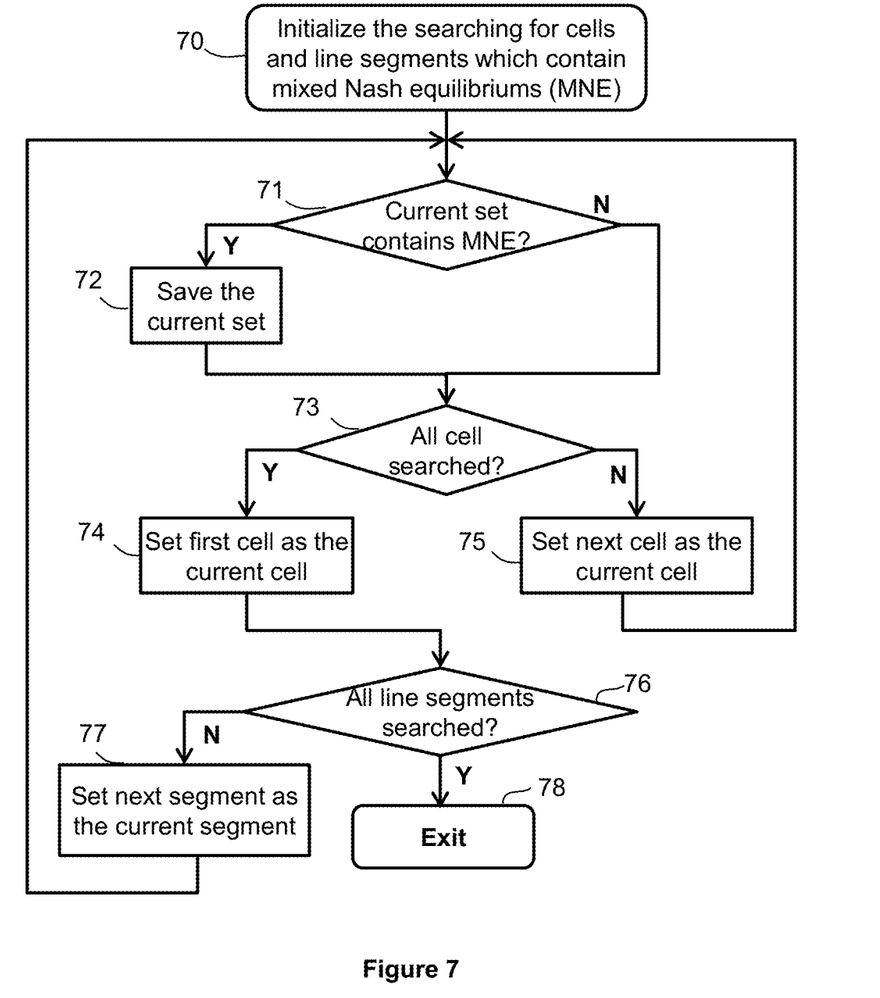
FIG. 7 is a flowchart showing the block 33, "determine a cell and line segment", of FIG. 3.

FIG. 7 is a flowchart showing the "determine a cell and line segment" block 33 in the process of FIG. 3. Block 70 is to initialize the searching by setting the sizes of the attacker action set, the PNS action set, and the ANS action set. It also set the initial position of the searching. Block 71 is to test whether current action surface cell and action curve segment contain the intersection. The details of this block are described in FIG. 8. Block 72 saves the current decision set if it contains the intersection. Otherwise, the process will search next set (surface cell and curve segment). This decision can be decomposed in Block 73-77. Block 73 will check whether all the surface cells are searched. If yes, it is ready to test the possible intersection between next curve segment and one of the all surface cells. The test will start from first curve segment as set in block 74. Block 76 will check whether all curve segments searched. If yes, the search processing ends and exits (block 78). If no, the next curve segment is set in block 77. Then it will repeat the search by going to block 71. Another possible outcome of block 73 is that unsearched cells for current curve segment may exist. Therefore, the next surface cell is set as the current cell in block 75. The test procedure repeats and goes to block 71. After all sets are searched, the process will exit (Block 78) with saved sets containing the intersection points, which are MNEs. The invention will further calculate the MNEs in Block 34 of FIG. 3.

Figure 8:
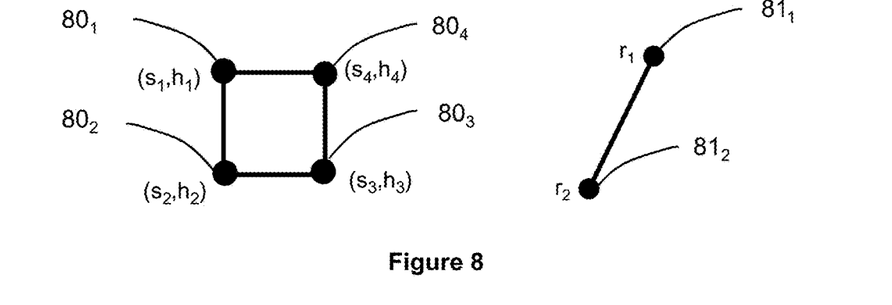
FIG. 8 depicts an exemplary cell and line segment to be searched for the intersection of action surface (of attacker) and action curve (defender).

FIG. 8 depicts an exemplary cell and line segment to be searched for the intersection of action surface (of attacker) and action curve (defender). 80₁-80₄ determine the action surface cell projected to ANS and PNS engines strategy space (like 43 in FIG. 4). 81₁ and 81₂ define the action curve segment, where $r_1$ and $r_2$ are the consecutive attacker strategies. Since all 6 points are on the action surface or action curve, the locations in three-dimensional (3D) spaces can be determined. This problem, of whether the set contains an intersection point, can be solved via the following way:

if $r_1r_2$ go through Δ123, true, exit;
else if $r_1r_2$ go through Δ124, true, exit;
else if $r_1r_2$ go through Δ134, true, exit;
else $r_1r_2$ go through Δ234, true, else false;

where Δ123 is the triangle determined by points 80₁, 80₂, and 80₃. Similar notes for Δ124, Δ134, and Δ234, The geometric solution to test whether a line segment go through a triangle is presented in FIG. 9.

Figure 9:
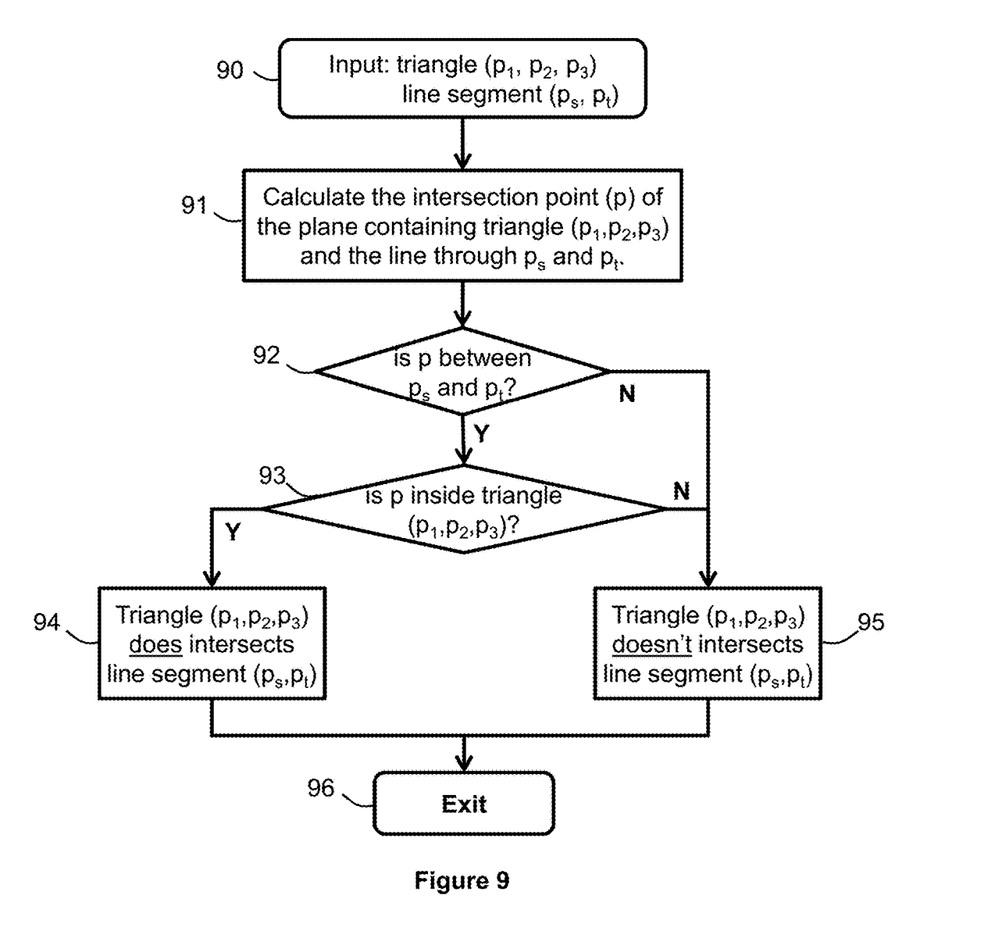
FIG. 9 is a flowchart showing the main process of "current set contains MNE?" route 71 in FIG. 7.

FIG. 9 is a flow chart of testing whether a line segment goes through a triangle. This part is the main process of "current set contains MNE?" route 71 in FIG. 7. Block 90 specifies the input and output structure. The inputs are the three points of the triangle and the line segment. The output is yes or no. Block 91 calculates the intersection point of the plane, which contains the triangle, and the line, which contains the line segment. The detail algorithm is listed as follows:

n=cross((p2−p1), (p3−p1)); % calculate the normal vector
if (n'*(pt−ps)==0), return false; % no intersection
r=n'*(p1−ps)/(n'*(pt−ps)); % calculate the ratio on the normal vector
p=ps+r*(pt−ps); % calculate the intersection point based on the ratio Note that the intersection may not be located in the triangle or in the line segment even if the intersection point exists. Therefore, blocks 92-95 are used here to further test whether the intersection point is in the triangle AND in the line segment. Block 92 checks if the intersection point p is between $p_s$ and $p_t$. If no, triangle (p1, p2, p3) doesn't intersect with the line segment (ps, pt) as stated in Block 95. Otherwise, the Block 93 is used to test whether the intersection point p is inside the triangle (p1, p2, p3). The details of the block 93 will be explained in the following FIG. 10. If the result of Block 93 is yes, triangle (p1, p2, p3) does intersect with the line segment (ps, pt) as stated in Block 94. Otherwise, the procedure goes to Block 95.

Figure 10:
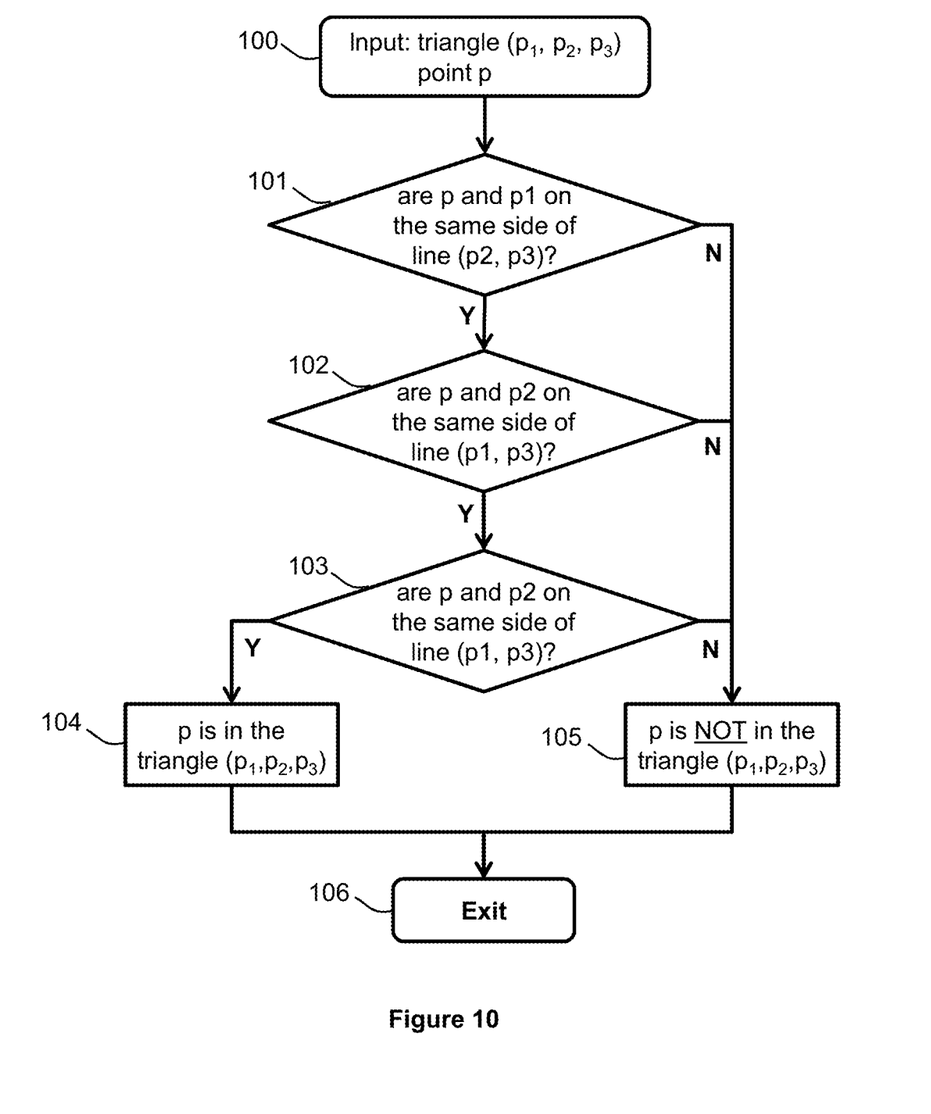
FIG. 10 is a flowchart showing the "is p insider a triangle (p1, p2, p3)?" route 93 in FIG. 9.

FIG. 10 is a flow chart showing the "is P insider a triangle (p1, p2, p3)?" route 93 in FIG. 9, Block 100 is to specify the input structure, which contains the three points of the triangle and a point to be tested. Given that the p and triangle are in the same plane (since p is the intersection point, p is in the plane contains the triangle), the geometric solution is based on following observation. A point p is the triangle ($p_1, p_2, p_3$), if and only if p and $p_1$ on the same side of the line through $p_2$ and $p_3$, AND
p and $p_2$ on the same side of the line through $p_1$ and $p_3$, AND
p and $p_3$ on the same side of the line through $p_1$ and $p_2$.

The invention uses the following geometric method to test where two points (p1, and p) on the same side of a line (p2, p3):

cp1=cross(p2−p3, p−p3); % calculate the cross product
cp2=cross(p2−p3, p1−p3); % calculate the cross product
IF cp1'*cp2>=0, same side. ELSE different side.

Blocks 101-106 depict the whole test processing of whether p insider a triangle (p1, p2, p3). Block 101 tests whether p and p1 are on the same side of line (p2, p3). If yes, the procedure continues in Block 102. Otherwise, p is not in the current triangle as stated in Block 105. Block 102 tests whether p and p2 are on the same side of line (p1, p3). If yes, the procedure continues in Block 103. Otherwise, p is not in the current triangle as stated in Block 105. Block 103 tests whether p and p3 are on the same side of line (p1, p2). If yes, p is in the current triangle as stated in Block 104. Otherwise, p is not in the current triangle as stated in Block 105. The procedure exits in Block 106.

Figure 11:
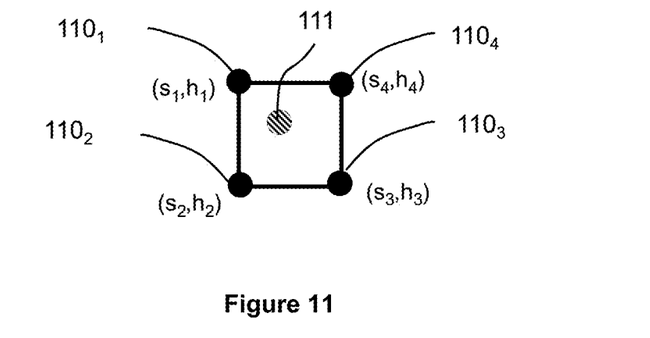
FIG. 11 depicts an exemplary cell and line segment containing the intersection of action surface (of attacker) and action curve (defender).

The next step (block 34 of FIG. 3) is to compute the MNE for a given action surface cell and action curve segment, which contains the intersection point. FIG. 11 depicts an exemplary cell and line segment containing the intersection of action surface (of attacker) and action curve (defender). Points 110₁-110₄ define the cell and point 111 is the intersection point. The exact position (in three dimensions: PNS s*, ANS h*, and Attacker r*, see FIG. 4 for visual illustration) of 111 can be formulated as $$s^* = \lambda_1 s_1 + \lambda_2 s_2 + \lambda_3 s_3 + (1-\lambda_1-\lambda_2-\lambda_3) s_4 \qquad (4)$$

$$h^* = \lambda_1 h_1 + \lambda_2 h_2 + \lambda_3 h_3 + (1-\lambda_1-\lambda_2-\lambda_3) h_4 \qquad (5)$$

$$r^* = \kappa_1 r_1 + (1-\kappa_1) r_2 \qquad (6)$$

where $0 \le \lambda_1 \le 1$, $0 \le (\lambda_1+\lambda_2+\lambda_3) \le 1$, and $0 \le \kappa_1 \le 1$. $r_1$ and $r_2$ are the attacking strategies of the two end points of active curvve segment. Then the rewards, J, are $$J^*_d = J_d(s^*, h^*, r^*) = f_d(\lambda_1, \lambda_2, \lambda_3, \kappa_1) \qquad (7)$$

$$J^*_a = J_a(s^*, h^*, r^*) = f_a(\lambda_1, \lambda_2, \lambda_3, \kappa_1) \qquad (8)$$

Since (s*, h*, r*) is a mixed Nash equilibrium, the following equations apply:

$$\partial f_d / \partial \lambda_1 = 0 \qquad (9)$$

$$\partial f_d / \partial \lambda_2 = 0 \qquad (10)$$

$$\partial f_d / \partial \lambda_3 = 0 \qquad (11)$$

$$\partial f_d / \partial \kappa_1 = 0 \qquad (12)$$

where $\lambda_1$, $\lambda_2$, $\lambda_3$, and $\kappa_1$ can be obtained by solving the equations (9-12). Then the MNE can be computed by eq. 4-6.

Block 35 of FIG. 3 is implemented the obtain MNE. For the defender side, the PNS engine will play $s_1$ strategy with probability $\lambda_1$, $s_2$ strategy with probability $\lambda_2$, $s_3$ strategy with probability $\lambda_3$, and s4 strategy with probability $1-\lambda_1-\lambda_2-\lambda_3$. The ANS engine will play $h_1$ strategy with probability $\lambda_1$, $h_2$ strategy with probability $\lambda_2$, $h_3$ strategy with probability $\lambda_3$, and h4 strategy with probability $1-\lambda_1-\lambda_2-\lambda_3$. Similarly, for the attacker side, the attacker will play the $r_1$ strategy with probability $\kappa_1$, and the $r_2$ strategy with probability $1-\kappa_1$. To implement the MNE, two uniformly distributed random variables over [0, 1], $X_d$ for defender and $X_a$ for attacker, will be created. Each time, the random values will be used to determine which pure strategy to use. If $X_d \in [0, \lambda_1]$, then PNS engine takes $s_1$ and ANS engine takes $h_1$. If $X_d \in (\lambda_1, \lambda_1+\lambda_2 9$, PNS engine takes $s_2$ and ANS engine takes $h_2$. If $X_d \in (\lambda_1+\lambda_2, \lambda_1+\lambda_2+\lambda_3]$, PNS engine takes $s_3$ and ANS engine takes $h_3$. If $X_d \in (\lambda_1+\lambda_2+\lambda_3, 1]$, PNS engine takes $s_4$ and ANS engine takes $h_4$. Similar, if $X_a \in [0, \kappa_1]$, the attacker will apply the $r_1$ strategy. If $X_a \in [\kappa_1, 1]$, the attacker will apply the $r_2$ strategy.

Block 36 and 37 of FIG. 3 are designed to let system update the states defined in eq. (1). Then the game can be updated with the new system states. Accordingly, the three-sided game solution can be calculated using the geometric solution of the present invention, which provides a closed loop control paradigm.

In general, geometry is a branch of mathematics concerned with questions of shape, size, relative position of figures, and the properties of space. The disclosed geometric solution solves the three-sided game model by finding a three-dimensional action curve (e.g. for a cyber defender) and a three-dimensional action surface (e.g. for a cyber attacker). The action surface or action curve is set of one side's best responses actions for all the opponents' possible choices of actions. In the three-sided game model, the ANS and PNS engines are coordinated to defend against attackers. Therefore, given a combined PNS and NAS engine choices (a two-dimensional point), the attacker computes his best response. All the attacker's best responses form a surface, which is called an action surface. This set is described in block 32 of FIG. 3. Similarly, for ANS and PNS engines, their combined best response is a curve, called an action curve, which is described in block 31 of FIG. 3. To find the intersection point between the action curve and the action surface, the first step is to find a cell containing the point, as described in block 33 of FIG. 3. The second step is to locate the intersection point in the cell, as described in block 23 of FIG. 3. Since the three-sided game solution is based on the geometric relation (intersection) of two shapes (action curve and action surface), the solution is called geometric solution in this disclosure.

For cyber applications, game theory is a relatively new concept and the use of a honeypot is a unique aspect of the work that enhances game-theoretic developments over active and passive sensors. To numerically solve the uniquely three-side game modeled cyber security problem, a geometric solution based on action surface and action curve is developed. To summarize, the present numerical game solution has four features: first, it can quickly determine whether the game problem has one Nash equilibrium, multiple Nash equilibriums, or no Nash equilibrium; second, it can efficiently check the equilibrium is a mixed or pure Nash; third, it can timely compute the (mixed) Nash equilibriums; and fourth, it also follows a Fictitious play concept, from which the solution is an adaptive one and can be applied for any partially observed cyber security system.

The invention claimed is:

1. A cyber security system, comprising:
   network servers, passive network sensors, and active network sensors in a cyber network;
   a computer with data network access and programmed for a three-sided game-theoretic analysis of interactions among cyber attackers, the passive network sensors, and the active network sensors,
   wherein the network servers are targets of the cyber attackers;
   wherein the passive network sensors and the active network sensors are defenders;
   wherein the passive network sensors are a Snort-based Passive Network Sensor (PNS) and the active network sensors are a Honeypot based Active Network Sensor (ANS);
   wherein the passive network sensors are controlled by PNS engine and the active network sensors are controlled by ANS engine, wherein the PNS engine and ANS engine are coordinated to defend against the cyber attackers and are reconfigured by implementing a mixed Nash equilibrium of the three-sided game-theoretic analysis;
   the honeypot, including the active network sensors, acting as an active side and camouflaged in the data network to help passive network sensors detect and track cyber network attacks originated from the cyber attackers; and
   wherein the passive network sensors monitor data network traffic and interacting with the honeypot, wherein the PNS engine choice ($s_k$), and the ANS engine choice ($h_k$) are combined and coordinated to defend against the cyber attackers computed best response ($r_k$), wherein:
   $k >= 1$;
   $h_k$, $s_k$ and $r_k$ are all scalar values;
   a set of $r_k$ of the cyber attackers are used to determine an action surface, and a set of $s_k$ and $h_k$ are combined and coordinated to obtain an action curve; and
   an intersection point of the action surface and the action curve are calculated according to a geometric solution, wherein the intersection point of the action surface and the action curve is used to calculate a solution of the mixed Nash equilibrium of the three-sided game theoretic analysis to provide a closed loop control paradigm.

2. The cyber security system of claim 1, wherein the action curve includes a three-dimensional action curve and a three-dimensional action surface the three-sided game-theoretic analysis utilizes three-dimensional action curve and a three-dimensional action surface to analyze and numerically solve three-sided game modeled cyber security problems.

3. A method for providing cyber security, comprising:
   providing network servers, passive network sensors, and active network sensors in a cyber network; and
   providing at least one computer with data network access and programmed for a three-sided game-theoretic analysis of interactions among cyber attackers, the passive network sensors, and the active network sensors,
   wherein the network servers are targets of the cyber attackers;
   wherein the passive network sensors and the active network sensors are defenders;
   wherein the passive network sensors are a snort-based passive network sensor (PNS) and the active network sensors are a honeypot based active network sensor (ANS);
   wherein the passive network sensors are controlled by PNS engine and the active network sensors are controlled by ANS engine, wherein the PNS engine and ANS engine are coordinated to defend against the cyber attackers and are reconfigured by implementing a mixed Nash equilibrium of the three-sided game-theoretic analysis;
   the honeypot, including the active network sensors, acting as an active side and camouflaged in the data network to help passive network sensors detect and track cyber network attacks originated from the network servers; and
   wherein the passive network sensors monitor data network traffic and interacting with the honeypot, wherein the PNS engine choice ($s_k$), and the ANS engine choice ($h_k$) are combined and coordinated to defend against the cyber attackers computed best response ($r_k$), wherein: k>=1;

$h_k$, $s_k$ and $r_k$ are all scalar values;

a set of $r_k$ of the cyber attackers are used to determine an action surface, and a set of $s_k$ and $h_k$ are combined and coordinated to obtain an action curve; and an intersection point of the action surface and the action curve are calculated according to a geometric solution, wherein the intersection point of the action surface and the action curve is used to calculate a solution of the mixed Nash equilibrium of the three-sided game theoretic analysis to provide a closed loop control paradigm.

4. The method for providing cyber security of claim 3, wherein the action curve includes a three-dimensional action curve and a three-dimensional action surface the three-sided game-theoretic analysis utilizes three-dimensional action curve and a three-dimensional action surface to numerically analyze and solve three-sided game modeled cyber security problems.

\* \* \* \* \*